US012462432B2

(12) United States Patent
White et al.

(10) Patent No.: US 12,462,432 B2
(45) Date of Patent: Nov. 4, 2025

(54) MULTI VIEW CAMERA REGISTRATION

(71) Applicant: SportsMEDIA Technology Corporation, Durham, NC (US)

(72) Inventors: Marvin S. White, San Carlos, CA (US); Radford Parker, San Mateo, CA (US); Divya Ramakrishnan, Santa Clara, CA (US); Louis Gentry, Union City, CA (US); Rand Pendleton, Santa Cruz, CA (US)

(73) Assignee: SportsMEDIA Technology Corporation, Durham, NC (US)

(*) Notice: Subject to any disclaimer, the term of this patent is extended or adjusted under 35 U.S.C. 154(b) by 0 days.

(21) Appl. No.: 18/410,600

(22) Filed: Jan. 11, 2024

(65) Prior Publication Data
US 2024/0153143 A1 May 9, 2024

Related U.S. Application Data

(63) Continuation of application No. 17/858,603, filed on Jul. 6, 2022, now Pat. No. 11,875,537, which is a continuation of application No. 16/952,831, filed on Nov. 19, 2020, now Pat. No. 11,386,581, which is a continuation of application No. 16/407,685, filed on
(Continued)

(51) Int. Cl.
*G06T 17/00* (2006.01)
*G06T 7/30* (2017.01)
*G06T 7/73* (2017.01)
*G06T 7/80* (2017.01)

(52) U.S. Cl.
CPC ............ *G06T 7/85* (2017.01); *G06T 7/30* (2017.01); *G06T 7/75* (2017.01); *G06T 7/80* (2017.01); *G06T 2207/30228* (2013.01)

(58) Field of Classification Search
CPC ..... G06T 7/85; G06T 7/30; G06T 7/75; G06T 7/80; G06T 2207/30228
See application file for complete search history.

(56) References Cited

U.S. PATENT DOCUMENTS 4,084,184 A 4/1978 Crain
5,353,392 A 10/1994 Luquet et al.
(Continued)

OTHER PUBLICATIONS

Agarwal, et al., "Bundle Adjustment in the Large," Eleventh European Conference on Computer Vision—ECCV 2010, Oct. 1, 2010.
(Continued)

*Primary Examiner* — Gims S Philippe
(74) *Attorney, Agent, or Firm* — NEO IP

(57) ABSTRACT

A system for registering one or more cameras and/or creating an accurate three-dimensional (3D) model of a world space environment including back projecting at least one image from at least one of a plurality of camera views to the 3D model based on a set of existing camera parameters. The back projected image is added as a texture for the 3D model. This texture is automatically compared to one or more images from other camera views using a color space comparison of images to determine a set of differences or errors. The camera parameters and the 3D model are automatically adjusted to minimized the differences or errors. Over time, the parameters and the 3D model converge on a state that can be used to track moving objects, insert virtual graphics and/or perform other functions.

20 Claims, 11 Drawing Sheets

Related U.S. Application Data

May 9, 2019, now Pat. No. 10,846,886, which is a continuation of application No. 15/266,541, filed on Sep. 15, 2016, now Pat. No. 10,290,119.

(56) References Cited

U.S. PATENT DOCUMENTS

| | | | |
|---|---|---|---|
| 5,436,672 | A | 7/1995 | Medioni et al. |
| 5,491,517 | A | 2/1996 | Kreitman et al. |
| 5,627,915 | A | 5/1997 | Rosser et al. |
| 5,808,695 | A | 9/1998 | Rosser et al. |
| 5,862,517 | A | 1/1999 | Honey et al. |
| 6,597,406 | B2 | 7/2003 | Gloudemans et al. |
| 6,728,637 | B2 | 4/2004 | Ford et al. |
| 6,744,403 | B2 | 6/2004 | Milnes et al. |
| 6,750,873 | B1 * | 6/2004 | Bernardini ............... G06T 7/55 345/581 |
| 6,864,886 | B1 | 3/2005 | Cavallaro et al. |
| 6,965,397 | B1 | 11/2005 | Honey et al. |
| 8,818,768 | B1 | 8/2014 | Fan et al. |
| 9,215,383 | B2 | 12/2015 | Milnes et al. |
| 2004/0104935 | A1 * | 6/2004 | Williamson ........... G06V 10/10 715/757 |
| 2006/0188131 | A1 | 8/2006 | Zhang et al. |
| 2007/0052698 | A1 | 3/2007 | Funayama et al. |
| 2007/0195285 | A1 | 8/2007 | Jaynes et al. |
| 2009/0315978 | A1 | 12/2009 | Würmlin et al. |
| 2010/0238351 | A1 * | 9/2010 | Shamur ................. H04H 60/37 348/E5.062 |
| 2011/0063403 | A1 | 3/2011 | Zhang et al. |
| 2011/0115909 | A1 | 5/2011 | Sternberg et al. |
| 2012/0281873 | A1 | 11/2012 | Brown et al. |
| 2012/0281881 | A1 | 11/2012 | Walter |
| 2013/0094696 | A1 * | 4/2013 | Zhang ..................... G06T 7/248 382/103 |
| 2013/0278727 | A1 * | 10/2013 | Tamir .................. H04N 13/239 348/47 |
| 2014/0214398 | A1 * | 7/2014 | Sanders ................. G06F 40/53 704/3 |
| 2015/0125034 | A1 | 5/2015 | Tateno |
| 2015/0276379 | A1 | 10/2015 | Ni et al. |
| 2016/0012588 | A1 | 1/2016 | Taguchi et al. |
| 2016/0041977 | A1 | 2/2016 | Ho et al. |
| 2017/0064279 | A1 * | 3/2017 | Chien .................. H04N 13/128 |
| 2017/0142309 | A1 | 5/2017 | Hayashi et al. |
| 2018/0075592 | A1 | 3/2018 | White et al. |
| 2019/0266755 | A1 | 8/2019 | White et al. |
| 2021/0074024 | A1 | 3/2021 | White et al. |
| 2022/0335652 | A1 | 10/2022 | White et al. |

OTHER PUBLICATIONS

Carr, et al., "Point-less Calibration: Camera Parameters from Gradient-Based Alignment to Edge Images," Applications of Computer Vision, 2012 IEEE Workshop, Mar. 5, 2012.

Davison, et al., "MonoSLAM: Real-Time Single Camera SLAM," IEEE Transactions on Pattern Analysis and Machine Intelligence 29(6):1052-67, Jul. 2007.

Fuentes-Pacheco, et al., "Visual simultaneous localization and mapping: a survey," Artificial Intelligence Review, vol. 43, Issue 1, Jan. 2015.

Triggs, et al., "Bundle Adjustment—A Modern Synthesis," ICCV 1999 Proceedings of the International Workshop on Vision Algorithms: Theory and Practice, Sep. 1999.

* cited by examiner

MULTI VIEW CAMERA REGISTRATION

CROSS-REFERENCES TO RELATED APPLICATIONS

This application relates to and claims priority from the following U.S. Patent application. This application is a continuation of U.S. patent application Ser. No. 17/858,603, filed Jul. 6, 2022, which is a continuation of U.S. patent application Ser. No. 16/952,831, filed Nov. 19, 2020 and issued as U.S. Pat. No. 11,386,581, which is a continuation of U.S. patent application Ser. No. 16/407,685, filed May 9, 2019 and issued as U.S. Pat. No. 10,846,886, which is a continuation of U.S. patent application Ser. No. 15/266,541, filed Sep. 15, 2016 and issued as U.S. Pat. No. 10,290,119, each of which is herein incorporated by reference in its entirety.

BACKGROUND OF THE INVENTION

1. Field of the Invention

The present invention relates to creating an accurate 3D model of world space using one or more cameras.

2. Description of Related Art

Data about the state of a camera (e.g., such as focal length, pan angle, tilt angle, zoom level and XYZ position in space) can be used in conjunction with images from the camera for many purposes, including inserting virtual graphics in perspective in images captured by the camera, using the camera as a measurement tool in order to track a moving object, or for other tasks. When using this data about the state of the camera, other information is necessary to interpret or use the data. Such information is referred to as camera parameters. The process for determining the camera parameters is referred to as camera registration.

The camera registration process involves obtaining one or more transformation matrices which provide a conversion between the image coordinate system 30 and the world coordinate system 37. Further information can be found in E. Trucco and A. Verri, "Introductory techniques for 3-D computer vision," chapter 6, Prentice Hall, 1998, U.S. Pat. No. 5,912,700, issued Jun. 15, 1999, and U.S. Pat. No. 6,133,946, issued Oct. 17, 2000, each of which is incorporated herein by reference.

It is well known in the art to simultaneously register a camera and to improve the accuracy of estimates of the 3D position of well-identified points in the scene. This simultaneous solving is known in the art as Bundle Adjustment (BA). Estimating 3D elements in a scene captured from a moving camera or from multiple viewpoints, called Structure from Motion (SfM), is also well known in the art. More generally, simultaneously solving for camera parameters and constructing a three-dimensional (3D) model of the environment is known in the art as Simultaneous Localization And Mapping (SLAM). SLAM can use BA or other methods, including Extended Kalman Filters (EKF), Unscented Kalman Filters (UKF) and particle filters. Sometimes well-identified points in the scene have well-known 3D locations, and such points are called Control Points (CPs). BA takes the prior known accuracy of positions of well-identified points into account in simultaneously improving position estimates. It is also known in the art to use lines and conic sections in addition to control points.

3D models, especially models that represent surfaces in 3D space, are also relevant. 3D Models are well known in the art, including terrain models, animated character models, and architectural models. Such models are typically made by artists using computer-based modeling tools, resulting in a machine-readable model. One such tool is Texture Mapping, which involves mapping an image or portion of an image, onto a surface of a model. Texture Mapping may also be regarded as a computerized form of painting with a brush or applying a decal to create detail and texture in a model.

It is common to register a single camera or register many cameras one at a time or register a single moving, panning, tilting and zooming camera many times (e.g., once per image captured). It is also well known in photogrammetry to simultaneously register multiple cameras viewing overlapping scenes.

SUMMARY OF THE INVENTION

A system is proposed that performs multi view camera registration, including registering one or more cameras and/or creating an accurate 3D model of a world space. The system includes back projecting at least one image from at least one of a plurality of camera views to the 3D model based on a set of existing camera parameters. The back projected image is automatically compared to one or more images from other camera views or prior knowledge using a color space comparison of images to determine a set of error metrics. The camera parameters and the 3D model are automatically adjusted to minimize the error metrics based on color spaced comparisons of images from the camera views.

DETAILED DESCRIPTION OF THE PRESENT INVENTION

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

Figure 1:
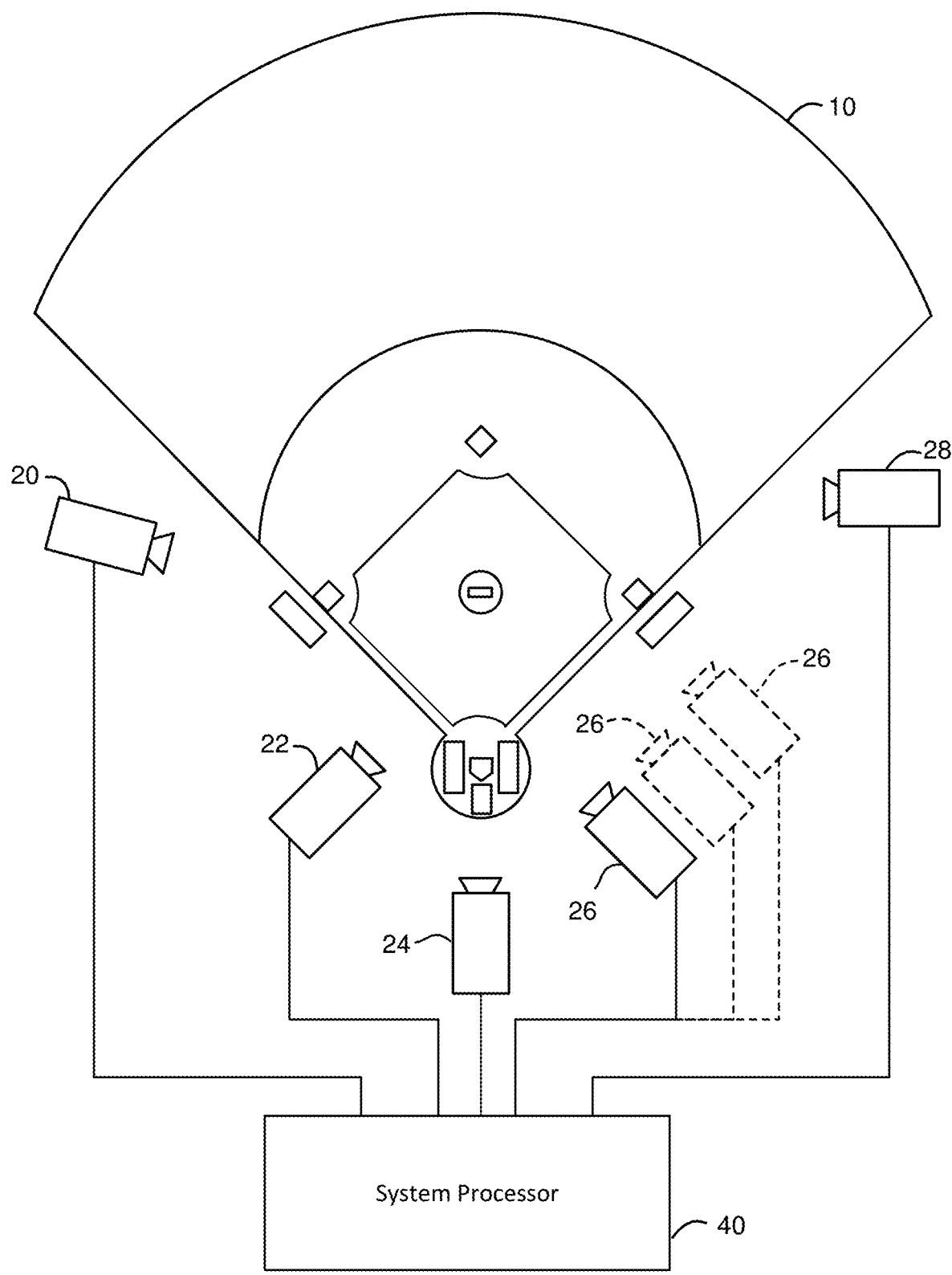
FIG. 1 is a block diagram depicting a system for enhancing video and/or tracking moving objects that can perform multi view camera registration.

A camera can be any sensor that captures images including visual images (e.g., still or video), depth images, images of ultra violet data, images of infra-red data. Each camera provides at least one camera view, which can be thought of as a perspective of a scene based on position. Thus, a camera that is fixed in location can only provide one camera view of a scene, while a camera that is mobile can provide many camera views. For example, FIG. 1 shows camera 26 once in solid lines, indicating the current location of camera 26. FIG. 1 also shows camera 26 twice in dashed lines, indicating the additional location that camera 26 can be in. Since camera 26 is a mobile camera, it can be moved to many different locations, thereby, providing many different camera views. As will be discussed in more detail below, the proposed system for registering cameras uses images from multiple camera views, which can be images from different cameras at different locations, one camera at different locations, or a combination of both.

Although the example used herein is made with respect to a baseball field, the technology proposed herein is not limited to baseball or sports. Rather, the technology proposed herein can be used at many different events and in many different environments. Baseball is only being used as a teaching example.

FIG. 1 is a block diagram depicting one example of a system for enhancing video and/or tracking moving objects that can perform the multi view camera registration described herein. FIG. 1 shows a baseball field. Located around baseball field 10 are cameras 20, 22, 24, 26 and 28, all pointed at some portion of baseball field 10. In other embodiments more or less than five cameras can be used. Each of cameras 20, 22, 24, 26 and 28 are connected via a wired or wireless connection to system processor 40.

Figure 2:
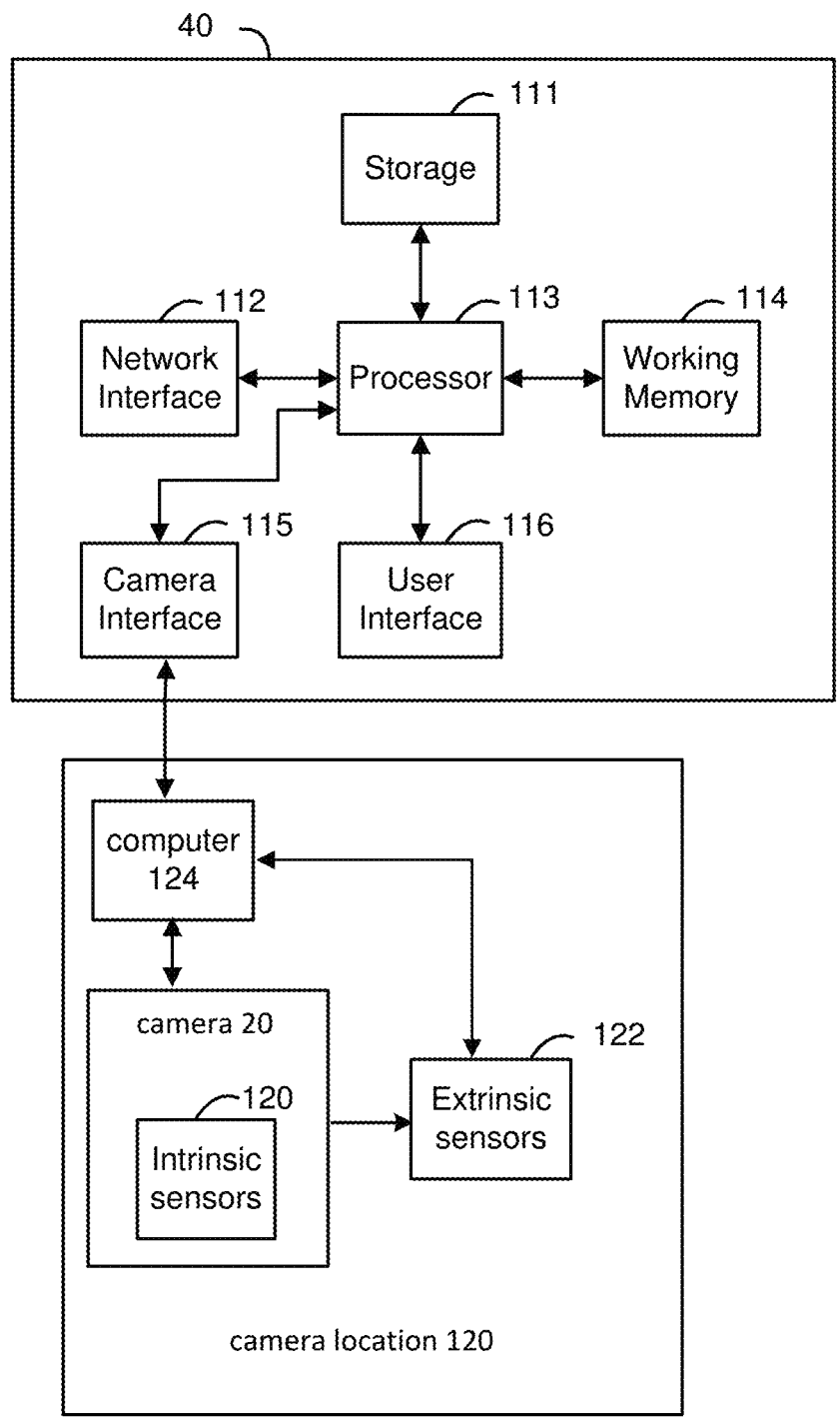
FIG. 2 is a block diagram depicting an implementation of the system processor and the camera locations of FIG. 1.

FIG. 2 depicts further details of system processor 40 and the equipment at cameras 20, 22, 24, 26 and 28. System processor 40 includes a storage device 111, network interface 112, processor 113, working memory 114, camera interface 115 and user interface 116. Storage device 111 includes, for example, one or more hard disk drives and/or one or more solid state drives that utilize flash memory (or other type of noni-volatile memory). Network interface 112 can be an Ethernet interface or wireless interface for communicating with other devices via a LAN or the Internet. Processor 113 can include one or more processors single core or multi-core processors for executing code (software instructions) to perform the functions described herein. Working memory 114, such as RAM, is used to store the code (software instructions) after the code is loaded from the storage device 111. While in memory 114, the code programs processor 113 to perform the functions described herein. Camera interface 115 is used to connect to and communicate with the cameras 20, 22, 24, 26 and 28. In one embodiment, there is a separate camera interface for each camera. In another embodiment, one camera interface communicated with all cameras. User interface 116 can include a touchscreen, keyboard and mouse to allow for interaction with a human operator. The storage device 111 and/or working memory 114 may be considered to be a processor readable storage device having processor readable code embodied thereon for programming the processor 13 to perform methods for providing the functionality discussed herein. The processor readable storage devices can include non-transitory, tangible computer readable media such as volatile and nonvolatile media, removable and non-removable media. Other processor readable storage devices can include DVDs or other optical disk storage, magnetic cassettes, magnetic tape, magnetic disk storage or other magnetic storage devices, or any other non-transitory, tangible medium which can be used to store the desired information and which can be accessed by a computer.

FIG. 2 shows system processor 40 connected to camera 20. System processor 40 is also connected to the other cameras, but FIG. 2 only shows camera 20 to make the drawing easier to read. In one embodiment, the other cameras would have the same or similar structures as described for FIG. 20.

Camera 20 is positioned at camera location 120, and may include (optional) intrinsic sensors 120, (optional) extrinsic sensors 122 and computer 124 (each of which can be mobile or stationary). The intrinsic sensors 120 are sensors inside the camera that provide state information, such as a zoom setting, whether an expander is used, current focal length, and so forth. The extrinsic sensors 122, connected to camera 20 and computer 124, are devices external to camera 20 that are added to determine state information. For example, extrinsic sensors 122 can be mounted directly on the camera or on a tripod to identify an orientation of the camera, such as a pan and tilt of the camera. Computer 124 receives the image data (analog or digital) from camera 20, data from the intrinsic sensors 120 and data from the extrinsic sensors 122 and provides the images data and data from the sensors to system processor 40 via a wired or wireless (direct or indirect) connection with camera interface 115.

In some applications, in order to use any one or more of the cameras 20-28 to insert virtual graphics into video, track an object, render a virtual animated scene, or other task, it is necessary to understand which locations in the real world correspond to which locations in the camera's image. To accomplish this, one embodiment may be to use a first coordinate system for the real world and a second coordinate system for the camera's image. The first coordinate system for the real world shall be referred to as the world coordinate system. The second coordinate system for the camera's image shall be referred to as the camera coordinate system. In some embodiments, there will be a separate camera coordinate system for each camera view. A third coordinate system can also be established for the undistorted image captured by a camera.

Figure 3:
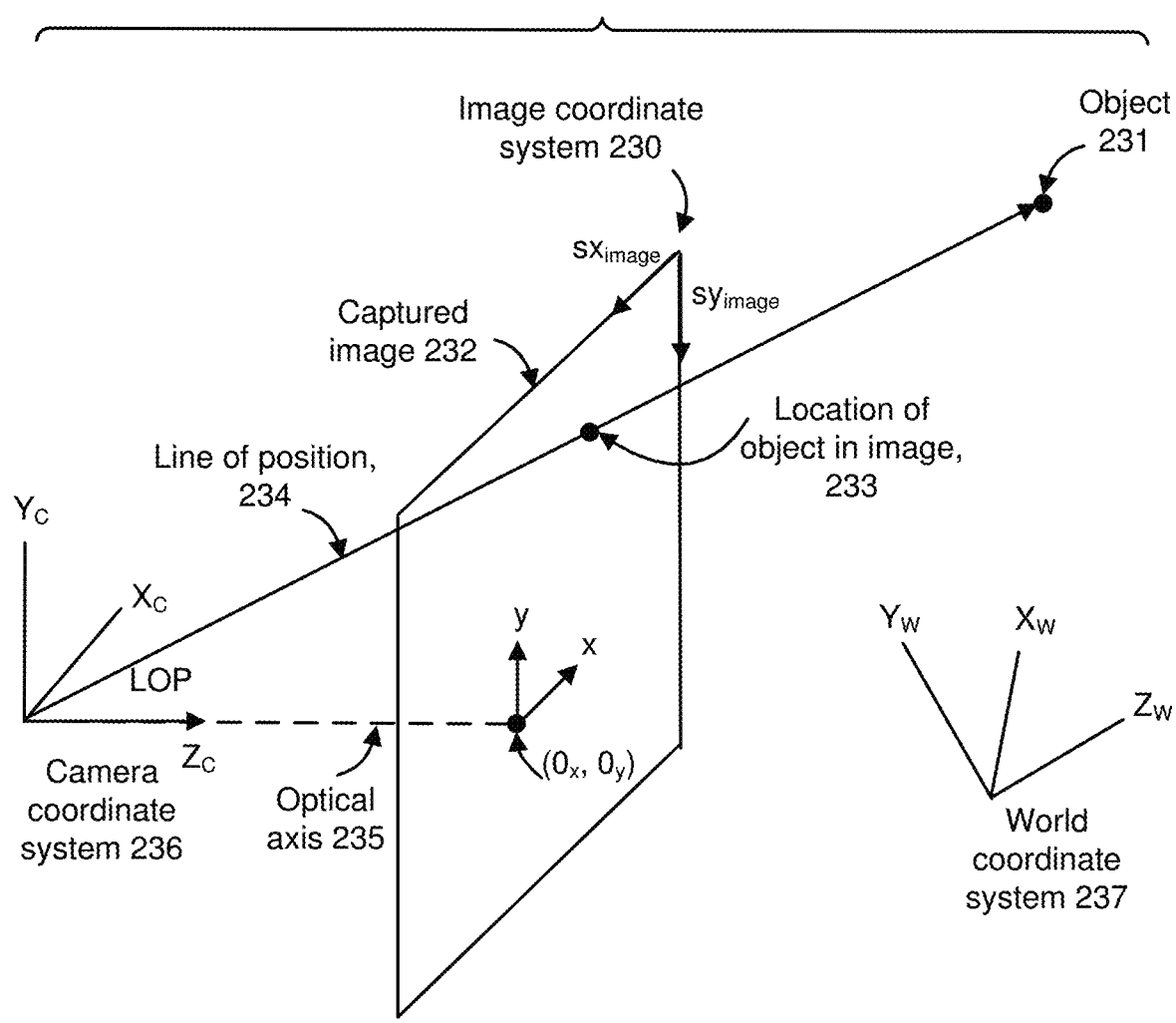
FIG. 3 depicts a relationship between a camera, an image, and world coordinate systems.

FIG. 3 depicts a relationship between camera, image and world coordinate systems, for use by system processor 40. A camera coordinate system 36, which includes orthogonal axes $X_C$, $Y_C$ and $Z_C$ in three dimensions, is fixed relative to the camera. The origin of the coordinate system may be at the center of the lens, in one possible approach, modeling the camera as a pinhole camera. An image coordinate system 230, also referred to as pixel space, includes orthogonal axes X and Y in two-dimensions, and is fixed relative to a captured image 232. A world coordinate system 237, which includes orthogonal axes $X_W$, $Y_W$ and $Z_W$, is fixed relative to, e.g., the earth, a baseball park or other event site, or other reference point or location. Generally, it is desirable to describe the position and/or path of the tracked object 231 in the world coordinate system 237 as this is typically the coordinate system in which its motion is most relevant to the user, and allows easier integration of the information from several cameras. A line of position (LOP) 234 is an imaginary line which extends from the origin of the camera coordinate system 236 through a pixel in the image 232, intersecting the pixel at a point 233, and through the tracked object 231. Each pixel in the image 232 corresponds to a different line of position. Point 233 in the captured image 32 represents the location of the object 231 in the image. The location of the object in the image 232 can be represented by coordinates ($s_x$, $s_y$) in a coordinate system which has its origin at a corner of the image, in one example approach. The coordinates may also identify the center of the object. When the object is a tracked human participant, characteristics such as the outline of the participant can be detected. More complex relationships between camera, image and world coordinate systems are well known in the art. One example is to include lens distortion into the transformation between world coordinates and image coordinates. It is not necessary to describe such additional complexities here.

Further, in one example approach, the line of position 234 can be represented by a 3-D vector which has unity magnitude. The vector can be defined by two points along the LOP. The vector can be represented in the world coordinate system 237 using an appropriate transformation from the image coordinate system. The $Z_C$ axis of the camera coordinate system, which is the optical axis of the camera, intersects the captured image at a point represented by coordinates ($0_x$, $0_y$). A two-dimensional coordinate system extending from ($0_x$, $0_y$) can also be defined.

As described above, some (not all) applications require the system to transform locations in world coordinates to positions in image coordinates. The task is to calculate the images coordinates, ($s_x$, $s_y$), given the world coordinates (world space) of a point. In practice, the point in world space might correspond to a physical object or a part of a geometrical shape, but in general can be any arbitrary point. One example method is to break the overall mapping into three separate mappings:

A mapping from three-dimensional (3D) points expressed in world coordinates (world space) to 3D points expressed in camera centered coordinates. We denote this mapping as $T_{WTC}$.

A mapping from 3D points expressed in camera centered coordinates, to undistorted two-dimensional (2D) image coordinates (e.g., a position in the video). This mapping models the effects of cameras; i.e. producing 2D images from 3D world scenes. We will denote this mapping as K.

A mapping from undistorted screen coordinates to distorted screen coordinates (e.g., a position in the video). This mapping models various effects that occur in cameras using lenses; i.e. non-pinhole camera effects. We will denote this mapping as f.

When composited together, the three mappings create a mapping from world coordinates into image (or screen) coordinates:

$$\begin{pmatrix} X_w \\ Y_w \\ Z_w \end{pmatrix} \underset{T_{WTC}}{\rightarrow} \begin{pmatrix} X_c \\ Y_c \\ Z_c \end{pmatrix} \underset{K}{\rightarrow} \begin{pmatrix} s_x \\ s_y \end{pmatrix} \underset{f}{\rightarrow} \begin{pmatrix} s'_x \\ s'_y \end{pmatrix} \quad (1)$$

Each of the three mappings noted above will now be described in more detail.

The mapping from 3D world coordinates to 3D camera centered coordinates ($T_{WTC}$) will be implemented using 4×4 homogeneous matrices and 4×1 homogeneous vectors. The simplest way to convert a 3D world point into a 3D homogeneous vector is to add a 1 into the 4th element of the 4×1 homogeneous vector:

$$\underbrace{\begin{pmatrix} X_w \\ Y_w \\ Z_w \end{pmatrix}}_{nonhomogenous} \mapsto \underbrace{\begin{pmatrix} X_w \\ Y_w \\ Z_w \\ 1 \end{pmatrix}}_{homogenous} = X_W \quad (2)$$

The way to convert from a 3D homogeneous vector back to a 3D nonhomogeneous vector is to divide the first 3 elements of the homogenous vector by the 4th element. Note that this implies there are infinitely many ways to represent the same nonhomogeneous 3D point with a 3D homogeneous vector since multiplication of the homogeneous vector by a constant does not change the nonhomogeneous 3D point due to the division required by the conversion. Formally we can write the correspondence between one nonhomogeneous vector to infinitely many homogeneous vectors as:

$$\underbrace{\begin{pmatrix} X_w \\ Y_w \\ Z_w \end{pmatrix}}_{nonhomogenous} \mapsto k \underbrace{\begin{pmatrix} X_w \\ Y_w \\ Z_w \\ 1 \end{pmatrix}}_{homogenous} \quad (3)$$

for any k≠0.

In general, the mapping T WTC can be expressed with a 4×4 matrix:

$$T_{WTC} = \begin{bmatrix} t_{11} & t_{12} & t_{13} & t_{14} \\ t_{21} & t_{22} & t_{23} & t_{24} \\ t_{31} & t_{32} & t_{33} & t_{34} \\ t_{41} & t_{42} & t_{43} & t_{44} \end{bmatrix} \quad (4)$$

which can be expressed using row vectors as:

$$T_{WTC} = \begin{bmatrix} t^{1T} \\ t^{2T} \\ t^{3T} \\ t^{4T} \end{bmatrix} \quad (5)$$

Finally, if we use homogeneous vectors for both the world point in world coordinates, $X_w$, and the same point expressed in camera centered coordinates, $X_c$ the mapping between the two is given by matrix multiplication using $T_{WTC}$:

$$X_c = T_{WTC} X_w \quad (6)$$

If we want the actual nonhomogeneous coordinates of the point in the camera centered coordinate system, we just divide by the 4th element of $X_c$. For example, if we want the camera centered x-component of a world point we can write:

$$X_c = \frac{t^{1T} X_w}{t^{4T} X_w} \quad (7)$$

To build the matrix $T_{WTC}$, we start in the world coordinate system (word space)—which is a specific UTM zone—and apply the following transformations:

Translate to the camera location: $T (H_x, H_y, H_z)$.

Account for the rotation relative to the world coordinate system: $R_z (-Pan_w)$, $R_x(-Tilt_w)$, $R_y (Roll_w)$.

Account for outer axis (outer axis of camera system) orientation relative to camera platform: $R_z$ (PanAdjust), $R_x$ (TiltAdjust), $R_y$ (RollAdjust).

Account for outer axis transducer measurement from camera system and offset of zero readings relative to outer axis: $R_z$ ($Pan_{Outer}$+PanAdjust2), $R_x$ ($Tilt_{Outer}$+TiltAdjust2).

Note that PanAdjust2 and TiltAdjust2 are adjustment values for imperfections in the outer axis orientation and can be determined during a camera registration process. If the output of the sensor should be 0 degrees, these parameters are used to recognize 0 degrees. $Pan_{Outer}$ and $Tilt_{Outer}$ are the sensor (e.g., transducer) readings output from the camera system 102 for the outer axis.

Account for non-linearity of inner axis (of camera system) pan and tilt transducer measurements via a look-up table: $Pan_{Inner\_linearized}=L(Pan_{Inner})$, $Tilt_{Inner\_linearized}=L'(Tilt_{Inner})$.

Account for inner axis transducer measurements and offset of zero readings relative to inner ring: $R_z$ ($Pan_{Inner\_linearized}$+PanAdjust3), $R_x$($Tilt_{Inner\_linearized}$+TiltAdjust3), $R_y$ ($Roll_{Inner}$+RollAdjust3).

Note that PanAdjust3, TiltAdjust3 and RollAdjust3 are adjustment values for imperfections in the inner axis orientation. If the output, of the sensor should be 0 degrees, these parameters are used to recognize 0 degrees. $Pan_{Inner}$, $Tilt_{Inner}$ and $Roll_{Inner}$ are the sensor (e.g., transducer) readings output from the camera system 102 for the inner axis.

Finally, convert to standard coordinate convention for camera centered coordinate systems with x-axis pointing to the right of the image, y-axis pointing up in the image, and z-axis pointing behind the camera:

$$R_x\left(\frac{\pi}{2}\right)$$

Thus, the final rigid-body transform, $T_{WTC}$ which converts points expressed in world coordinates to points expressed in the camera centered coordinate system and suitable for multiplication by a projection transform is given by:

$$T_{WTC} = \quad (8)$$
$$R_x\left(\frac{\pi}{2}\right)R_y(Roll_{Inner} + RollAdjust3) \cdot R_x(Tilt_{Inner\_linearized} + TiltAdjust3) \cdot$$
$$R_z(Pan_{Inner\_linearized} + PanAdjust3) \cdot R_x(Tilt_{Outer} + TiltAdjust2)$$
$$R_z(Pan_{Outer} + PanAdjust2) \cdot R_y(RollAdjust) \cdot R_x(TiltAdjust)$$
$$R_z(PanAdjust) \cdot R_y(Roll_{Hell})R_x(-Tiltw)R_z(-Panw)T(H_x, H_y, H_z)$$

The form of the three rotation matrices: $R_x$, $R_y$, $R_z$ suitable for use with 4×1 homogeneous vectors are given below. Here the rotation angle specifies the rotation between the two coordinate systems basis vectors.

$$R_x(\alpha) = \begin{bmatrix} 1 & 0 & 0 & 0 \\ 0 & \cos\alpha & \sin\alpha & 0 \\ 0 & -\sin\alpha & \cos\alpha & 0 \\ 0 & 0 & 0 & 1 \end{bmatrix} \quad (9)$$

$$R_y(\alpha) = \begin{bmatrix} \cos\alpha & 0 & -\sin\alpha & 0 \\ 0 & 1 & 0 & 0 \\ \sin\alpha & 0 & \cos\alpha & 0 \\ 0 & 0 & 0 & 0 \end{bmatrix} \quad (10)$$

$$R_z(\alpha) = \begin{bmatrix} \cos\alpha & \sin\alpha & 0 & 0 \\ -\sin\alpha & \cos\alpha & 0 & 0 \\ 0 & 0 & 1 & 0 \\ 0 & 0 & 0 & 1 \end{bmatrix} \quad (11)$$

The matrix representation of the translation transform that operates on 4×1 homogeneous vectors is given by:

$$T(d_x, d_y, d_z) = \begin{bmatrix} 1 & 0 & 0 & d_x \\ 0 & 1 & 0 & d_y \\ 0 & 0 & 1 & d_z \\ 0 & 0 & 0 & 1 \end{bmatrix} \quad (12)$$

The mapping of camera centered coordinates to undistorted image coordinates (K) can also be expressed as a 4×4 matrix which operates on homogenous vectors in the camera centered coordinate system. In this form the mapping from homogeneous camera centered points, $X_c$, to homogeneous image points, $S_u$ is expressed:

$$S_u = KX_c \quad (13)$$

$$w\begin{pmatrix} s_x \\ s_y \\ s_z \\ 1 \end{pmatrix} = KX_c \quad (14)$$

To get the actual undistorted image coordinates from the 4×1 homogenous screen vector we divide the first three elements of $S_u$ by the 4th element.

Note further that we can express the mapping from homogeneous world points to homogeneous undistorted image points via matrix multiplication.

where, $$S_u = KT_{WTC}X_w$$
$$= PX_w$$
$$P = KT_{WTC} \quad (15)$$

One embodiment uses a pinhole camera model for the projection transform K. If it is chosen to orient the camera centered coordinate system so that the x-axis is parallel to the $s_x$ image coordinate axis, and the camera y-axis is parallel to the $s_y$ image coordinate axis—which itself goes from the bottom of an image to the top of an image—then K can be expressed as:

$$K = \begin{bmatrix} -\dfrac{f'}{par} & 0 & u_o & 0 \\ 0 & -f' & v_o & 0 \\ 0 & 0 & A & B \\ 0 & 0 & 1 & 0 \end{bmatrix} \quad (16)$$

where, $$f' = \frac{N_y/2}{\tan(\varphi/2)} \quad (17)$$

$N_y$ = number of pixels in vertical screen direction $\varphi$ = vertical field of view $par$ = pixel aspect ratio $u_o, v_o$ = optical center $A, B$ = Clipping plane parameters.

The clipping plane parameters, A, B, do not affect the projected image location, $s_x$, $s_y$, of a 3D point. They are used for the details of rendering graphics and are typically set ahead of time. The number of vertical pixels, $N_y$ and the pixel aspect ratio par are predetermined by video format used by the camera. The optical center, ($u_o$, $v_o$) is determined as part of a calibration process. The remaining parameter, the vertical field of view $\varphi$, is the parameter that varies dynamically.

The screen width, height and pixel aspect ratio are known constants for a particular video format: for example, $N_x$=1920, $N_y$=1080 and par=1 for 1080i. The values of $u_o$, $v_o$ are determined as part of the camera registration process. That leaves only the field of view, $\varphi$, which needs to be specified before K is known.

The field of view can determined on a frame by frame basis using the following steps: use the measured value of the 2X Extender to determine the 2X Extender state; use the 2X Extender state to select a field of view mapping curve; use the measured value of field of view, or equivalently zoom, and the particular field of view mapping curve determined by the 2X Extender state to compute a value for the nominal field of view; use the known 2X Extender state, and the computed value of the nominal field of view in combination with the measured focus value, to compute a focus expansion factor; and compute the actual field of view by multiplying the nominal field of view by the focus expansion factor.

One field of view mapping curve is required per possible 2X Extender state. The field of view mapping curves are determined ahead of time and are part of a calibration process.

One mapping between measured zoom, focus and 2X Extender and the focus expansion factor is required per possible 2X Extender state. The focus expansion factor mappings are determined ahead of time and are part of a calibration process.

The mapping (f) between undistorted image coordinates to distorted image coordinates (pixels) is not (in one embodiment) represented as a matrix. In one example, the model used accounts for radial distortion. The steps to compute the distorted screen coordinates from undistorted screen coordinates are: start with the non-homogenous screen pixels $s_u=(s_x,s_y)^T$; compute the undistorted radial distance vector from a center of distortion, $s_o$ $\delta r = s_u - s_o$; compute a scale factor $\alpha = 1 + k_1 \|\delta r\| + k_2 \|\delta r\|^2$; compute the nonhomogeneous screen pixel vector $s_d = \alpha \delta r + s_o$.

Some Embodiments Will Also Normalize the Data.

The two constants $k_1$, $k_2$ are termed the distortion coefficients of the radial distortion model. An offline calibration process is used to measure the distortion coefficients, $k_1$, $k_2$, for a particular type of lens at various 2X Extender states and zoom levels. Then at run time the measured values of zoom and 2X Extender are used to determine the values of $k_1$ and $k_2$ to use in the distortion process. If the calibration process is not possible to complete, the default values of $k_1=k_2=0$ are used and correspond to a camera with no distortion. In this case the distorted screen coordinates are the same as the undistorted screen coordinates.

From the above discussion, PanAdjust2, TiltAdjust2, PanAdjust3, TiltAdjust3, RollAdjust3, vertical field of view $\varphi$, distortion coefficients, $k_1$, $k_2$, and camera location T (Hx, Hy, Hz) are examples of camera parameters that need to be solved for in order for some embodiments to perform virtual insertion of graphics, tracking of moving objects, etc. In other embodiments, the camera parameters will include additional and/or other values/variables/constants/offsets needed to use the data from the camera sensors in order to transform positions between coordinate systems.

Figure 4:
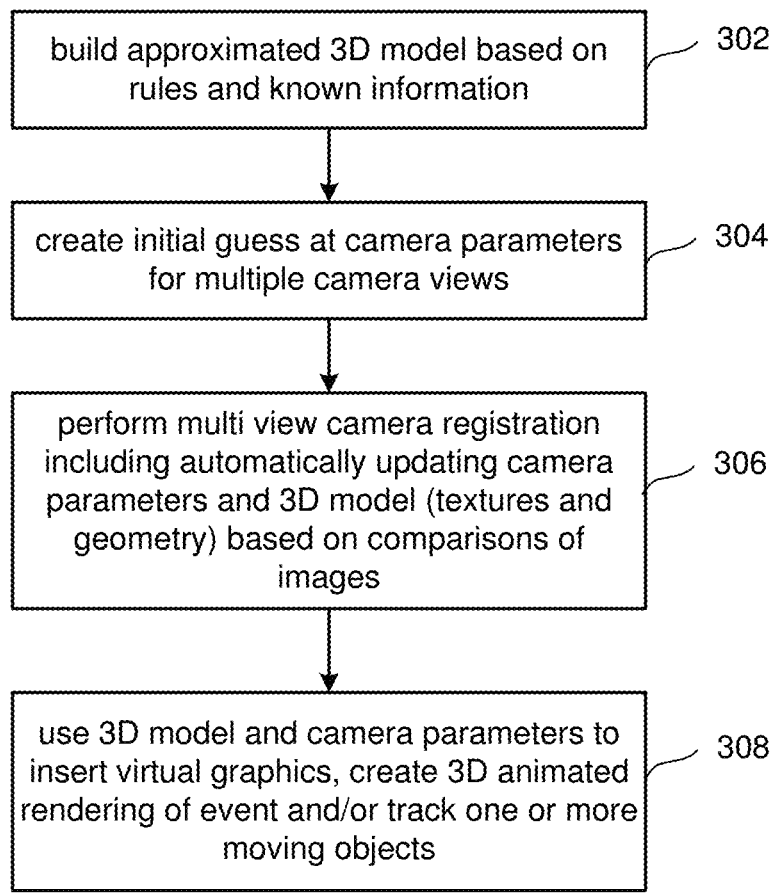
FIG. 4 is a flow chart describing one embodiment of a process for operating the system described herein.
Figure 5:
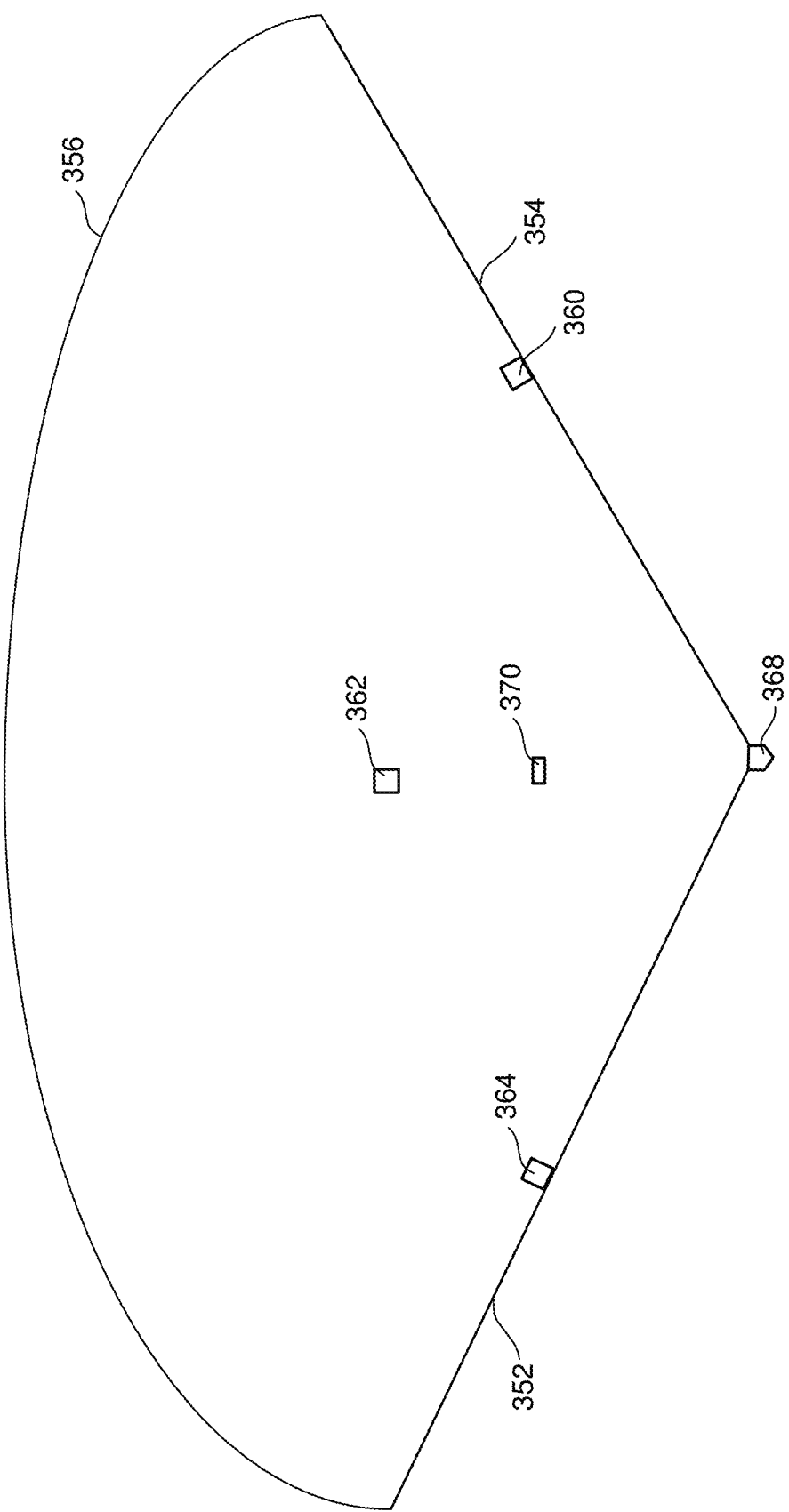
FIG. 5 depicts one example of a model.

FIG. 4 is a flow chart describing one embodiment of a process for operating a system described above with respect to FIGS. 1-3. In step 302, an approximated 3D model of an environment is built (manually or automatically) using known information (e.g., known rules, specification, etc.). If manually, a human can create a rough model of an area in world space based on information and rules using a computer. For example, when creating a model of a baseball field, the rules for how far apart bases are located, how far a pitcher's mound is from home plate, and distance/angle between sidelines can be taken into account to create a computer-based model of the baseball field. If created automatically, the model can be created by a system processor 40 or another computing system. In one embodiment, the 3D model built in step 302 is flat (e.g. two dimensional), meaning that even though it is a three-dimensional model, only two dimensions are represented in the first draft of the model. For example, FIG. 5 depicts one embodiment of approximated 3D model created as part of step 302 when the environment being modeled is a baseball field. The model of FIG. 5 is a two-dimensional, at this point in time. The model includes left sideline 352, right sideline 354, outfield edge 356, first base 360, second base 362, third base 364, home plate 368 and pitcher's mound 370. Major League Baseball rules for the dimensions of the field are used to specify the relative locations of all of the features depicted in the model of FIG. 5, with the exception of outfield boundary 356. When stored in memory, the model can include a set of 3D coordinates.

Looking back at FIG. 4, in step 304, system processor 40 automatically creates an initial guess at camera parameters for multiple camera views. In one embodiment, a human can manually create the initial guess of the camera parameters. In step 306, system processor 40 performs multi view camera registration, including automatically updating the camera parameters and the 3D model (including updating textures and geometry of the model) based on comparisons of images (discussed in more detail below). In step 308, system processor 40 (or another computing system) uses the updated 3D model and the updated camera parameters to insert virtual graphics into video from one or more cameras, create a 3D animated rendering of an event depicted by the cameras, track one or more moving objects in the video captured by the cameras, or perform another function.

Figure 6:
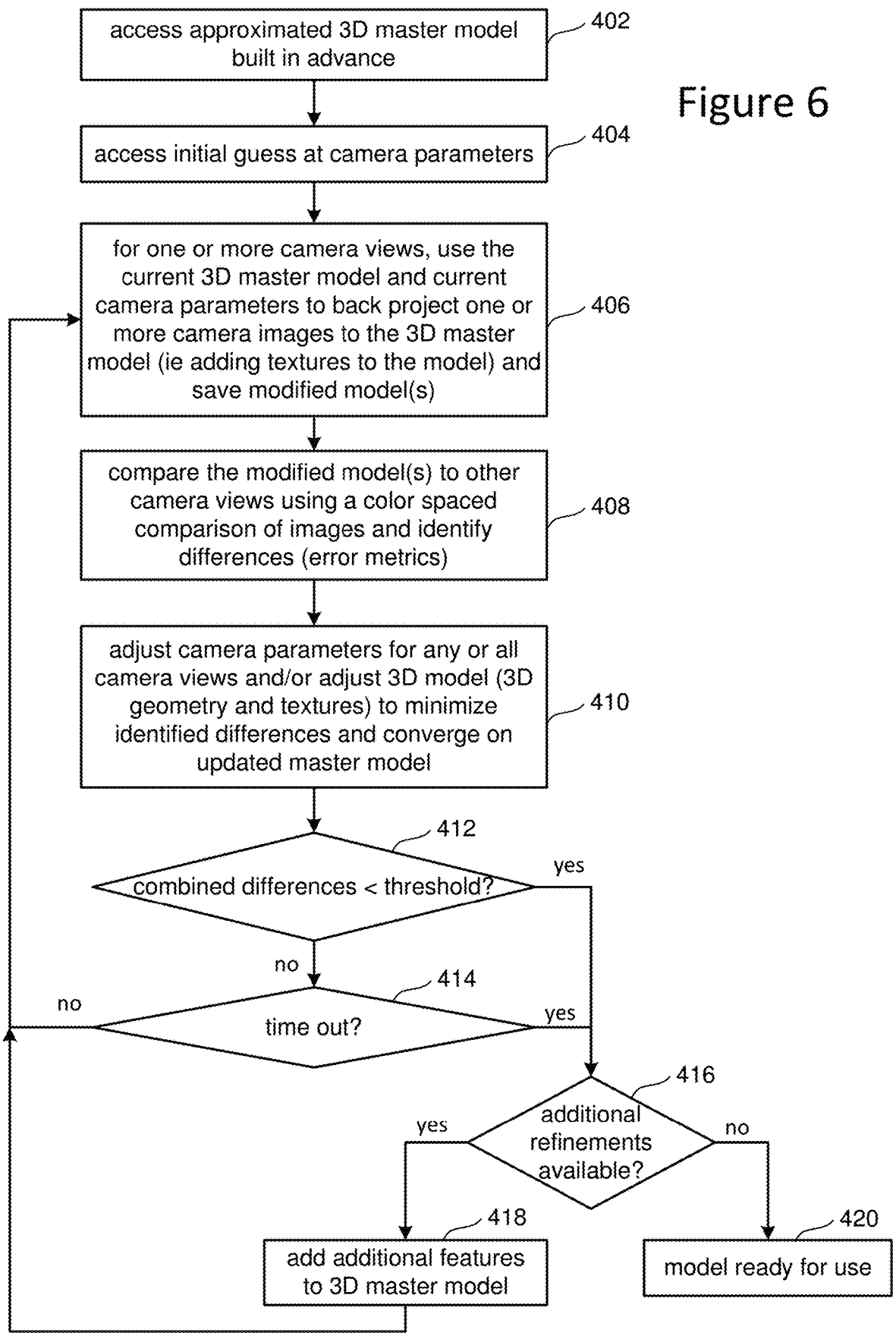
FIG. 6 is a flow chart describing one embodiment of a process for performing multi view camera registration.

FIG. 6 is a flowchart describing one embodiment of a process for performing multi-view camera registration. The process of FIG. 6 is one example implementation of step 306 of FIG. 4. In one embodiment, the process of FIG. 6 is performed by system processor 40. In step 402 of FIG. 6, system processor 40 accesses the approximated 3D master model that was built in advance. For example, step 402 includes accessing the model built in step 302 of FIG. 4. In one example, the model of FIG. 5 is accessed in step 402 of FIG. 6. In step 404, system processor 104 accesses the initial guess at parameters (e.g., created in step 302 of FIG. 4).

For one or more camera views, system processor 40 uses the current 3D master model (the model accessed in step 402) and the current camera parameters to back project one or more camera images to the 3D master model in step 406 of FIG. 6. The back projecting includes adding textures to the model. In one embodiment, textures are added for multiple camera views to a single instance of the 3D master model. In other embodiments, textures from different camera views are added to different instances of the 3D master model (with the different instances of the 3D master model being later reconciled to form on 3D master model). Step 406 includes saving the one or more instances of the modified 3D master model(s). In step 408, system processor 40 compare the one or more modified model(s) to other camera views using a color space comparison of images in order to identify differences in the images. That is, system processor 40 automatically compares the back projected image from a camera view to one or more images from other camera views using the color space comparison of images to determine differences between the images. Note that differences between the images resulting from a color space comparison of images is one example of an error metric. Other error metrics can also be determined. In one example implementation, system processor 40 aligns images from different camera views using the current camera parameters and then determine differences in these images, representing the error metrics. Note that a color space comparison of images can include comparing multiple color images, single color images, black & white images, or grayscale images.

Step 410 includes adjusting the camera parameters for any or all of the camera views and/or adjusting the 3D model (including adjusting the three-dimensional geometry and textures for the model) to minimize the identified differences (and/or other error metrics) in order to converge on an updated master model. That is, step 410 includes adjusting the 3D master model by adding additional details to the 3D master model, changing details to the 3D master model and adjusting existing camera parameters, all based on the color-based comparison discussed above. Step 410 includes using SfM with BA to adjust the camera parameters and the 3D master model in order to minimize differences in the images. Thus, the current technology proposed herein employs SfM using textures as well as well-identified points, lines or conics in the scene.

Steps 408 and 410 can include comparing many sets of images; therefore, multiple difference values and/or multiple error metrics are calculated. A total set of error metrics and/or differences can be combined to create a combined differences value using any suitable formula or relationship. In step 412, it is tested whether the combined difference is less than a threshold. If not, then additional BA can be performed and the process will continue in step 414. In step 414, it is determined whether the process is timed out. If not, then the process moves back to step 406 and steps 406-410 are repeated for the updated 3D model and updated set of camera parameters. Thus, steps 406-414 create a loop that is performed repeatedly until the differences in images (and/or other error metrics) are reduced to below a threshold, or if the process times out. When it is determined that the combined differences are less than the threshold (step 412) or that the process is timed out (step 414), then the method continues at step 416 and it is determined whether there are other refinements that could be made to the 3D master model. If not, the 3D master model is ready to be used, for example, to insert virtual graphics, create a 3D animated rendering of an event and/or track one or more moving objects, as well as other uses. If, however, there are other additional refinements that are available to be made to the 3D master model (step 416), then in step 418 the additional features are added to the 3D model and the process continues in step 406.

Figure 7:
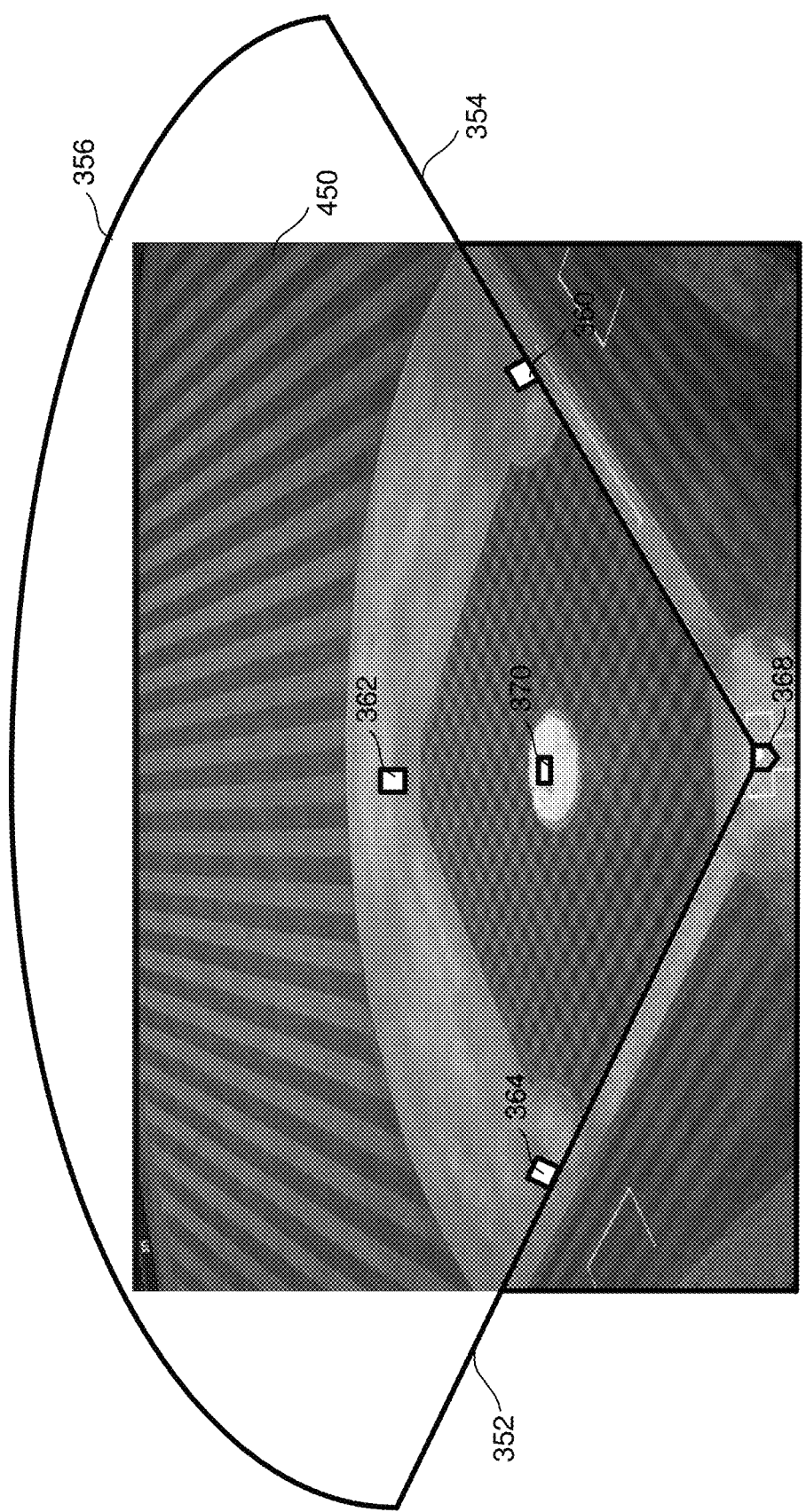
FIG. 7 depicts the model of FIG. 5 after one or more textures have been added.

As discussed above, step 406 of FIG. 6 includes back projecting one or more images from any one or more of the camera views onto the master 3D model. FIG. 7 depicts the model of FIG. 5 with one or more images back projected onto that 3D master model as a texture for the 3D master model. Each time step 406 is performed, it is possible to add one or more additional images as textures to the model. Additionally, each time step 410 is performed, any one of the textures can be adjusted and/or the geometry of the model can be adjusted. For example, if textures overlap and are different, the system will adjust the textures; for example, by choosing one of the overlapping textures, combining the textures, or another operation involving the textures. When adjusting the geometry of the 3D master model, the system can add three dimensional shapes to the model, change 3D shapes, remove 3D shapes, etc. In one embodiment, the three-dimensional shapes are randomly added, changed and/or removed at various boundaries identified by features in the model or textures and the system determines whether the randomly adding, changing and/or removing of three-dimensional features increases or decreases the differences (and/or other error metrics).

Figure 8:
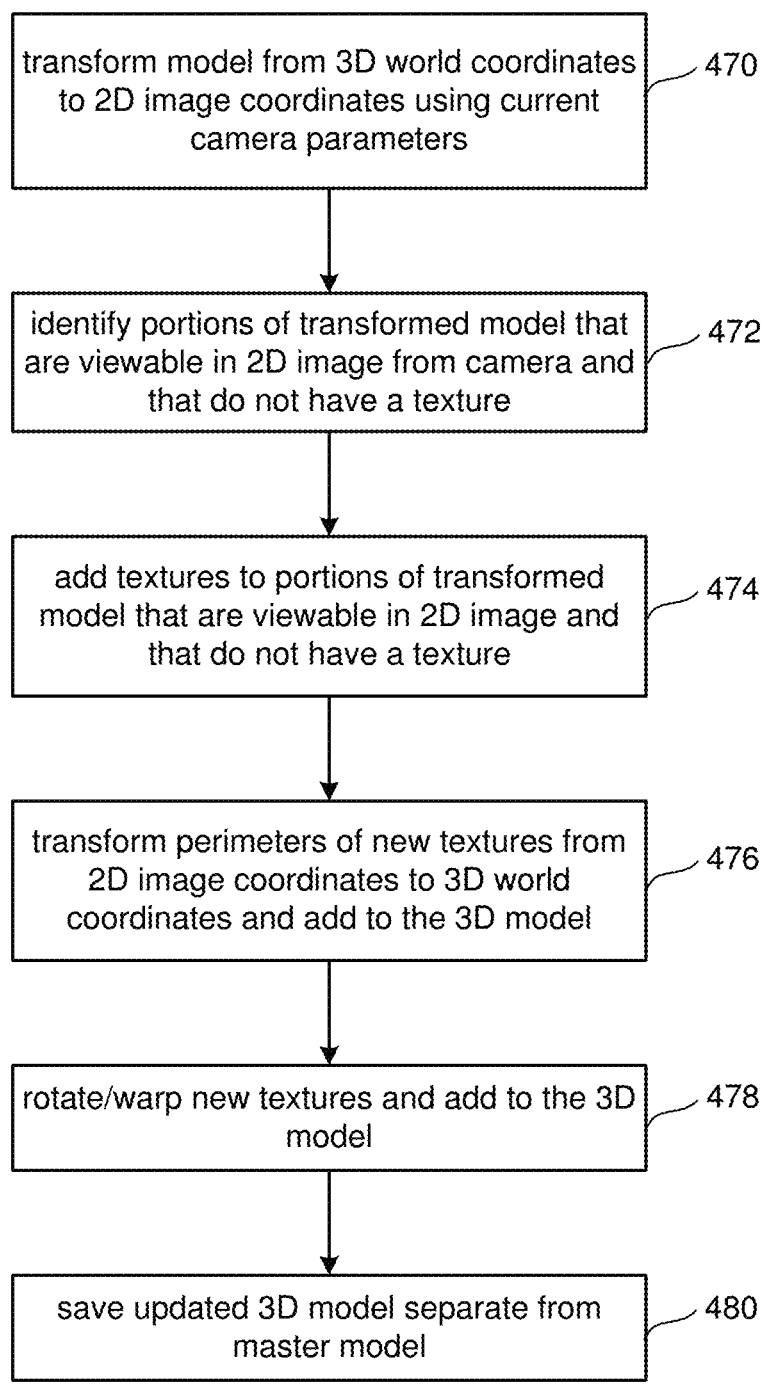
FIG. 8 is a flow chart describing one embodiment of a process for back projecting one or more camera images to a model.

FIG. 8 is a flowchart describing one embodiment of a process for back projecting an image to the 3D master model that is performed as part of step 406 of FIG. 6. In step 470, system processor 40 transform the 3D master model from 3D world coordinates to 2D image coordinates using the current camera parameters. This includes transforming known locations in the model, transforming perimeters of any textures in the model and rotating/warping any textures on the model. In step 472, system processor 40 identifies portions of the transformed model that are viewable in the 2D image from the camera and that do not have a texture. In step 474, one or more textures are added to the portions of the transformed model that are viewable in the 2D image and that do not have a texture already. These textures are from the image captured by the camera being operated on. In step 476, perimeters of the new texture(s) are transformed from the 2D image coordinates to 3D world coordinates and added to the 3D model. In step 478, the actual texture being added to the model is rotated/warped and added to the 3D master model based on the transformation of its corners. In step 480, the updated 3D model is saved separate from the 3D master model (at least temporarily). The process of FIG. 8 is for one camera view. When performing the process of FIG. 6, step 406 can include performing the process of FIG. 8 multiple times for multiple different cameras views. In other embodiments, step 406 can include only performing the process of FIG. 8 for one camera view.

One embodiment of steps 406-410 of FIG. 6 includes back projecting images from multiple camera views onto one or more modified models and then comparing the images (textures) of the one or more modified models in order to create differences and adjusting the camera parameters and model to minimize those differences. Another embodiment includes back projecting images from one camera view onto the model and then transforming that updated model to image coordinates for multiple other camera views and then doing the comparison of images in the image coordinate system to create the set of differences. These two embodiments are described in more detail with respect to FIGS. 9 and 10.

Figure 9:
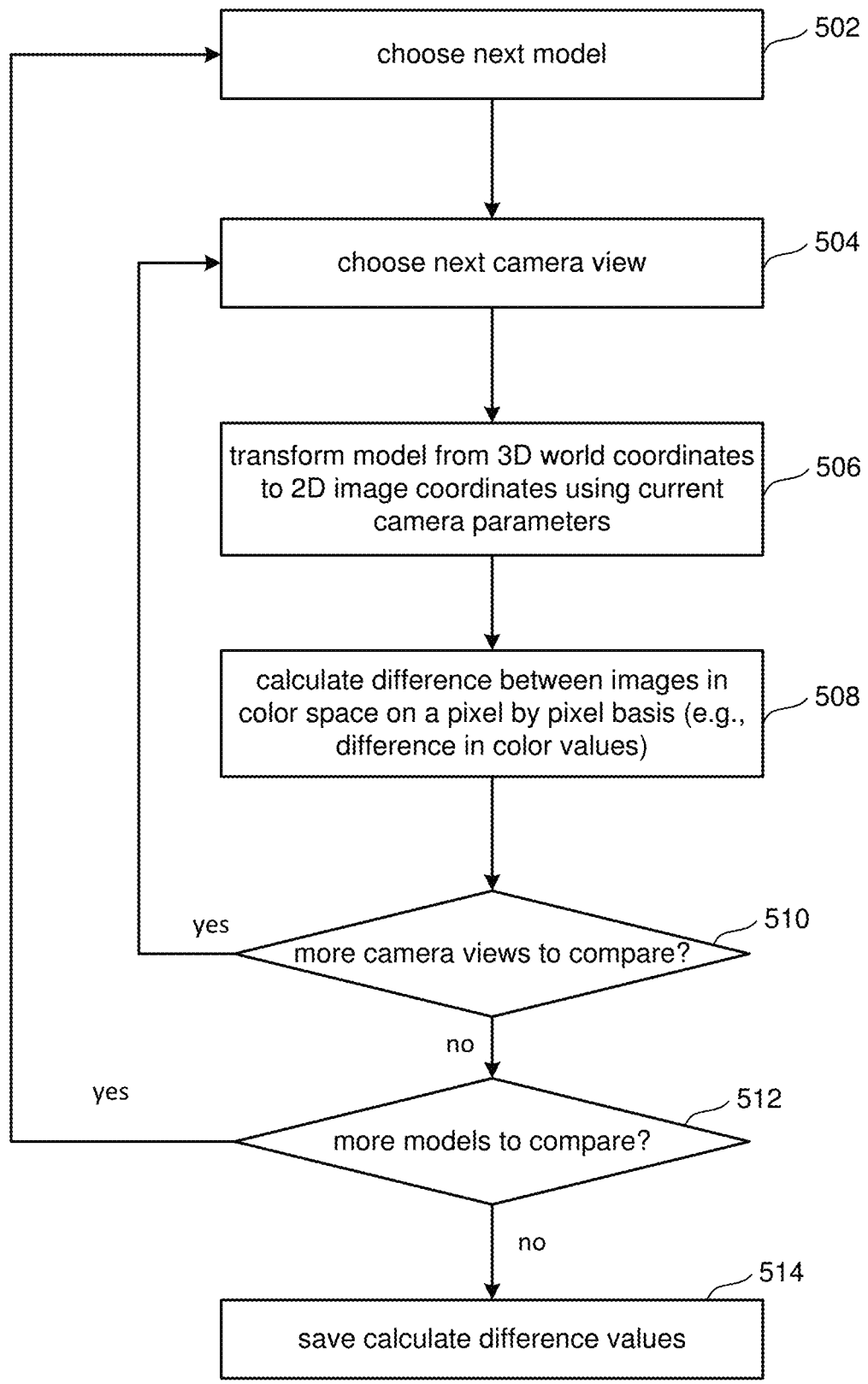
FIG. 9 is a flow chart describing one embodiment of a process for automatically comparing the back projected image to one or more images from other camera views using a color space comparison of images to determine a set of error metrics.

FIG. 9 is a flowchart describing one embodiment of a process automatically comparing the back projected image to one or more images from other camera views using a color space comparison of images to determine a set of error metrics. The embodiment of FIG. 9 includes back projecting images from one or more different camera views onto the 3D master model to create one or more modified models and then transforming those one or more modified models to the image space for various camera views and comparing the images from the camera views to the textures of the models in the image space to determine difference values. In step 502, system processor 40 chooses the next model. In step 504, system processor 40 chooses the next camera view to operate on. In step 506, the currently chosen model is transformed from 3D world coordinates to 2D image coordinates for the camera view chosen in step 504, using the current camera parameters for that camera view chosen in step 504. In step 508, the system processor 40 calculates a difference between images in a color space on a pixel-by-pixel basis (e.g., difference in color values of the pixels) for the image of the chosen camera view and the image of the textures after the model is transformed. Thus, this embodiment does a difference in images. This difference in image (representing one example of an error metric) is stored. In step 510, it is determined whether there are more camera views to compare the model to. In one embodiment, the model will be compared to every camera view available. If there are more camera views to compare the current model to the process loops back to step 504, chooses the next camera view and continues to step 506 and 508 to do the additional comparison(s). When all camera views for the current model have been compared, then at step 512 it is determined whether there are more modified models to compare. In one embodiment, all the modified models created in step 406 will be transformed to all the camera views. Thus, if there are more modified models to operate on, then the process will loop from step 512 back to step 502, choose the next modified model, and then iterate through all the camera views in the loop created by steps 504-510. After all models have been used (step 512), then all the different values calculated in all the iterations in step 508 will be saved by system processor 40 in step 514.

Figure 10:
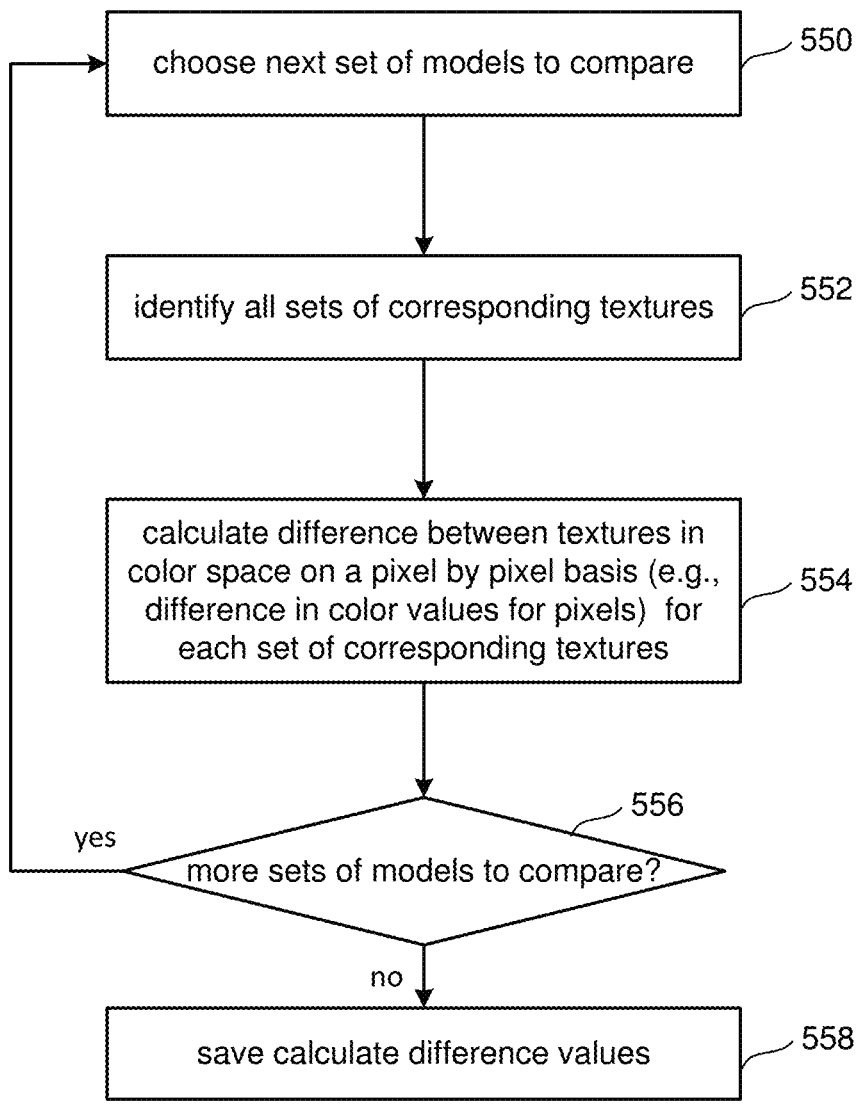
FIG. 10 is a flow chart describing one embodiment of a process for automatically comparing the back projected image to one or more images from other camera views using a color space comparison of images to determine a set of error metrics.

FIG. 10 is a flowchart describing one embodiment of a process automatically comparing the back projected image to one or more images from other camera views using a color space comparison of images to determine a set of error metrics. The process of FIG. 10 is an alternative embodiment to the process of FIG. 9. Both the process of FIG. 9 and the process of FIG. 10 are example implementations of step 408 of FIG. 6. In the embodiment of FIG. 10, textures from all (or a subset of) the different models are compared against each other to create the difference values, which are subsequently attempted to be minimized in step 410 of FIG. 6. In step 550 of FIG. 10, system processor 40 chooses the next set of models to compare. In one embodiment, every permutation of two, three, etc., modified models can be compared. In step 552, for the set of modified models being compared, system processor 40 identifies all sets of corresponding textures. For example, two textures are corresponding if they overlap the same portion of the model. In step 554, the system will calculate a difference value between the textures in color space by subtracting the textures on a pixel-by-pixel basis (e.g., subtracting color values for the pixels). In step 556, the system determines whether there are more sets of models to compare. If so, the process loops back to step 550 and the next set of models are compared. If all permutations of sets of models to be compared have already been compared, then the process continues in step 568 and saves all the different values calculated in all the iterations in step 554.

Figure 11:
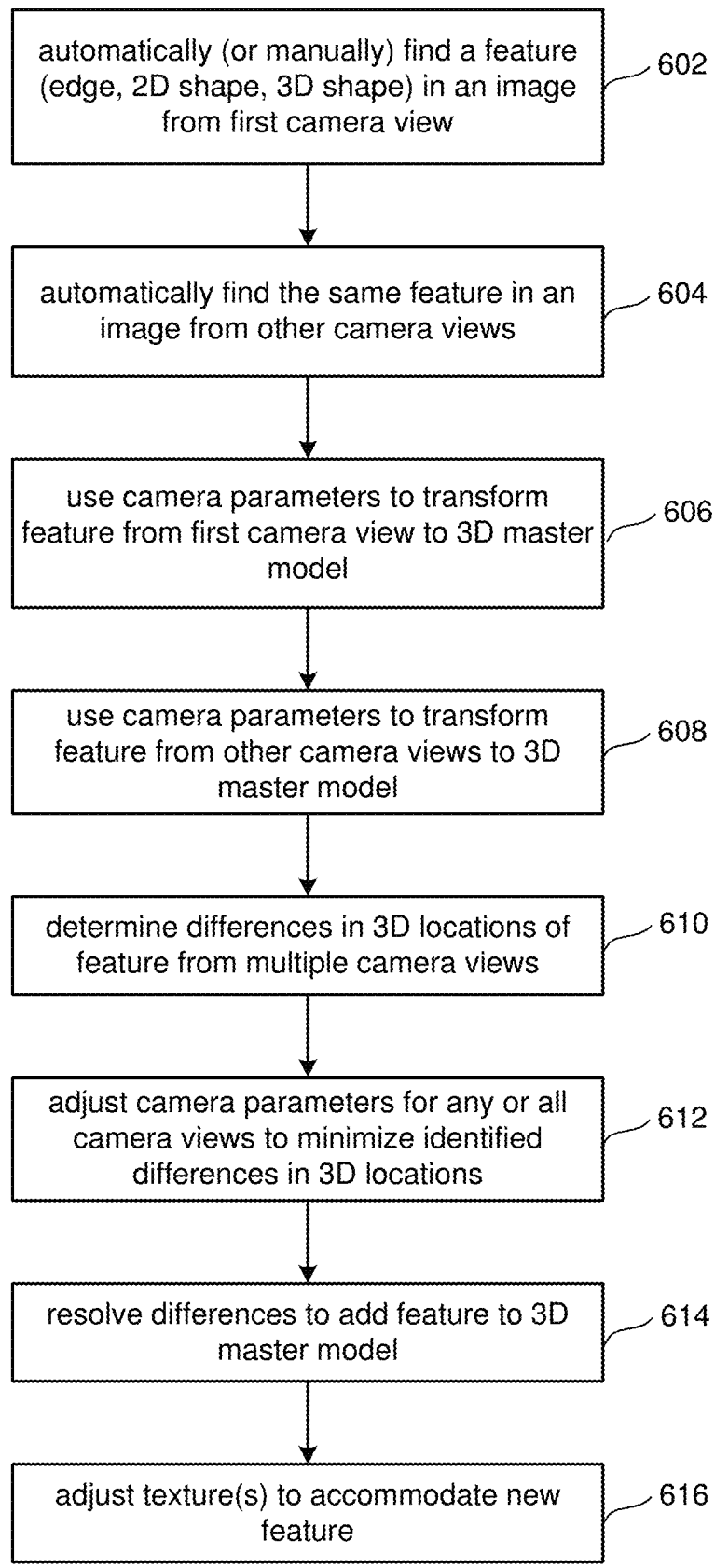
FIG. 11 is a flow chart describing one embodiment of a process for adding additional features to a model.

Step 418 in FIG. 6 includes refining the model by adding additional features to the 3D master model. FIG. 11 is a flowchart describing one embodiment of a process for adding the additional features to the 3D master model. Therefore, the process of FIG. 11 is one example implementation of step 418 of FIG. 6.

In step 602 of FIG. 11, system processor 40 automatically (or a human will manually) find a feature (e.g., edge, two-dimensional shape, three-dimensional shape, etc.) in an image from a first camera view. In step 604, system processor 40 automatically (or a human manually) finds that same feature in an image from one or more other camera views. In step 606, the current set of camera parameters for the relevant camera views are used to transform the found features from the first camera view to the 3D master model. In step 608, the current camera parameters are used to transform the found feature from the other camera views (see step 604) to the 3D model. In step 610, system processor 40 determines the differences in the 3D locations of the features found based on the transformation from the multiple camera views. In step 612, the system will continually adjust the camera parameters for any or all the camera views to minimize any identified differences in the 3D locations from step 610. This process can utilize BA. In step 614, system processor 40 resolves any differences in the 3D locations and adds the final location and feature to the 3D master model. That is, step 612 attempts to minimize the differences; however, it may be impossible to have zero difference. Therefore, the system may need to take an average of the location or some other mathematical approximation in order to resolve the difference in transformed 3D locations. In step 616, one or more textures in the model can be adjusted to accommodate the new feature. For example, if the three-dimensional shape of the pitcher's mound is being added to the 3D master model, then the texture showing the image of the pitcher's mound may be adjusted to be on a more spherical or conical surface rather than on a flat surface.

One embodiment includes a method comprising back projecting at least one image from at least one of a plurality of camera views to a 3D model of a world space environment based on a set of camera parameters; automatically comparing the back projected image to one or more images from other camera views to determine a set of error metrics; and automatically adjusting the camera parameters and the 3D model to minimize the error metrics based on the comparing.

One embodiment includes an apparatus, comprising: one or more processors; and one or more processor readable storage mediums connected to the one or more processors. The one or more processor readable storage mediums are configured to store code for programming the one or more processors to add an image from at least one of a plurality of camera views to a model of an environment based on a set of camera parameters, compare the added image to an image from a different camera view using a color spaced comparison of images to determine one or more differences between the added image and the image from the different camera view, and adjust the camera parameters and the 3D model to minimize the one or more differences between the added image and the image from the different camera view based on color spaced comparisons of images.

One embodiment includes an apparatus, comprising: one or more processors; and one or more processor readable storage mediums connected to the one or more processors. The one or more processors are configured to access sets of camera parameters for different camera views and access images from the different camera views. The one or more processors configured to attempt to align the images from the different camera views using the camera parameters. The one or more processors are configured to perform a color-based comparison of the attempted aligned images and determine differences between the attempted aligned images based on the color-based comparison. The one or more processors configured to adjust the camera parameters to minimize the differences between the attempted aligned images.

One embodiment includes a method, comprising: projecting an image from at least one of a plurality of camera views to a 3D model of a word space environment; performing a color-based comparison of the projected image to one or more images from other camera views; and adding an additional detail to the 3D model based on the color-based comparison.

One embodiment includes an apparatus, comprising: one or more processors; and one or more processor readable storage mediums connected to the one or more processors. The one or more processors are configured to add an image from at least one of a plurality of camera views to a model of a word space environment. The one or more processors are configured to perform an images-based comparison of the added image to one or more images from other camera views. The one or more processors are configured to add an additional detail to the model based on the imaged based comparison.

For purposes of this document, references in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The invention claimed is:

1. A method for imposing virtual graphics into camera video, comprising:
   constructing an initial approximate 3D model of a space based on known information regarding the space, wherein the initial approximate 3D model is flat;
   generating initial estimates for camera parameters for a plurality of cameras;
   receiving camera images from the plurality of cameras and automatically updating the initial approximate 3D model and the camera parameters based on the camera images, wherein the camera images include identified points, lines, or conics in the space;
   determining world coordinates for at least one virtual graphic to impose onto video produced by one or more of the plurality of cameras;
   transforming the world coordinates for the at least one virtual graphic to camera coordinates, and imposing the at least one virtual graphic on the video produced by the one or more of the plurality of cameras; and
   collecting data from at least one extrinsic sensor mounted on the one or more of the plurality of cameras;
   wherein the at least one extrinsic sensor comprises a pan sensor and/or a tilt sensor.

2. The method of claim 1, wherein automatically updating the initial approximate 3D model and camera parameters includes comparing back projected images from a first of the plurality of cameras to back projected images from a second of the plurality of cameras.

3. The method of claim 2, further comprising determining a set of error metrics by comparing the back projected images from the first of the plurality of cameras to back projected images from the second of the plurality of cameras, and aggregating the set of error metrics into a combined differences value.

4. The method of claim 3, wherein automatically updating the initial approximate 3D model includes repeating the back projecting of the images from the plurality of cameras and comparing the back projected images until the combined differences value is less than a threshold value.

5. The method of claim 3, wherein comparing the back projected images from the first of the plurality of cameras to the back projected images from the second of the plurality of cameras includes comparing color values of the back projected images from the first of the plurality of cameras to color values of the back projected images from the second of the plurality of cameras.

6. The method of claim 1, further comprising tracking at least one moving object in the video produced by the one or more of the plurality of cameras.

7. The method of claim 1, wherein automatically updating the initial approximate 3D model includes modifying geometries and/or textures of the initial approximate 3D model.

8. The method of claim 1, wherein the camera parameters include a camera location, distortion coefficients, vertical field of view, tilt angle, pan angle, roll angle, and/or zoom level.

9. An apparatus for imposing virtual graphics into camera video, comprising:
   one or more processors; and
   one or more non-transitory, tangible computer readable storage media connected to the one or more processors;
   wherein the one or more processors are configured to construct an initial approximate 3D model of a space based on known information regarding the space, wherein the initial approximate 3D model is flat;

wherein the one or more processors are configured to generate initial estimates for camera parameters for a plurality of cameras;

wherein the one or more processors are configured to receive camera images from the plurality of cameras and automatically update the initial approximate 3D model and the camera parameters based on the camera images, wherein the camera images include identified points, lines, or conics in the space;

wherein the one or more processors are configured to determine world coordinates for at least one virtual graphic to impose onto video produced by one or more of the plurality of cameras;

wherein the one or more processors are configured to transform the world coordinates for the at least one virtual graphic to camera coordinates, and imposing the at least one virtual graphic on the video produced by the one or more of the plurality of cameras;

wherein the one or more of the plurality of cameras includes at least one extrinsic sensor comprising a pan sensor and/or a tilt sensor; and wherein the plurality of cameras are operable to capture ultraviolet data.

10. The apparatus of claim 9, wherein the one or more processors automatically updating the initial approximate 3D model and camera parameters includes comparing images from a first of the plurality of cameras to images from a second of the plurality of cameras.

11. The apparatus of claim 10, where the one or more processors are configured to determine a set of error metrics by comparing the images from the first of the plurality of cameras to the images from the second of the plurality of cameras, and aggregating the set of error metrics into a combined differences value.

12. The apparatus of claim 11, wherein the one or more processors automatically updating the initial approximate 3D model includes repeatedly comparing the images from the plurality of cameras until the combined differences value is less than a threshold value.

13. The apparatus of claim 11, wherein comparing the images from the first of the plurality of cameras to the images from the second of the plurality of cameras includes comparing color values of the images from the first of the plurality of cameras to color values of the images from the second of the plurality of cameras.

14. The apparatus of claim 9, wherein the one or more processors are further operable to track at least one moving object in the video produced by the one or more of the plurality of cameras.

15. The apparatus of claim 9, wherein the one or more processors automatically updating the initial approximate 3D model includes modifying geometries and/or textures of the initial approximate 3D model.

16. The apparatus of claim 9, wherein the camera parameters include a camera location, distortion coefficients, vertical field of view, tilt angle, pan angle, roll angle, and/or zoom level.

17. An apparatus for imposing virtual graphics into camera video, comprising:

one or more processors; and one or more non-transitory, tangible computer readable storage media connected to the one or more processors;

wherein the one or more processors are configured to construct an initial approximate 3D model of a space based on known information regarding the space, wherein the initial approximate 3D model is flat;

wherein the one or more processors are configured to generate initial estimates for camera parameters for a plurality of cameras;

wherein the one or more processors are configured to receive camera images from the plurality of cameras and automatically update the initial approximate 3D model and the camera parameters based on the camera images by comparing images from a first of the plurality of cameras to images from a second of the plurality of cameras, wherein the camera images include identified points, lines, or conics in the space;

where the one or more processors are configured to determine a set of error metrics by comparing the images from the first of the plurality of cameras to the images from the second of the plurality of cameras, and aggregating the set of error metrics into a combined differences value;

wherein the one or more processors are configured to impose the at least one virtual graphic onto video produced by one or more of the plurality of cameras;

wherein the one or more of the plurality of cameras includes at least one extrinsic sensor comprising a pan sensor and/or a tilt sensor; and wherein the one or more processors are operable to perform multi-view camera registration.

18. The apparatus of claim 17, wherein the one or more processors automatically updating the initial approximate 3D model includes repeatedly comparing the images from the plurality of cameras until the combined differences value is less than a threshold value.

19. The apparatus of claim 17, wherein comparing the images from the first of the plurality of cameras to the images from the second of the plurality of cameras includes comparing color values of the images from the first of the plurality of cameras to color values of the images from the second of the plurality of cameras.

20. The apparatus of claim 17, wherein the one or more processors are further operable to track at least one moving object in the video produced by the one or more of the plurality of cameras.

* * * * *